United States Patent [19]

Weber et al.

[11] 4,324,918

[45] Apr. 13, 1982

[54] N,N-DIMETHYL-N'-ISOBUTYL-N'-β-HYDROXYETHYL-PROPYLENEDIAMINE AND A PROCESS FOR ITS PREPARATION

[75] Inventors: Jürgen Weber, Oberhausen; Volker Falk, Voerde; Claus Kniep, Oberhausen, all of Fed. Rep. of Germany

[73] Assignee: Ruhrchemie Aktiengesellschaft, Oberhausen, Fed. Rep. of Germany

[21] Appl. No.: 193,697

[22] Filed: Oct. 3, 1980

[30] Foreign Application Priority Data

Oct. 4, 1979 [DE]  Fed. Rep. of Germany ....... 2940256

[51] Int. Cl.$^3$ .................... C07C 91/08; C07C 91/12
[52] U.S. Cl. .................... 564/503; 521/129; 528/53; 564/473; 564/477
[58] Field of Search .................... 564/503; 528/53

[56] References Cited

U.S. PATENT DOCUMENTS

| | | | |
|---|---|---|---|
| 3,428,469 | 2/1969 | Cyba | 564/503 X |
| 3,527,804 | 9/1970 | Cyba | 564/503 X |
| 3,925,268 | 12/1975 | Rosemund et al. | 528/53 X |
| 4,101,462 | 7/1978 | Cuscurida et al. | 528/53 X |
| 4,255,528 | 3/1981 | Raden et al. | 528/53 X |

OTHER PUBLICATIONS

Rhone–Poulenc, "Chem. Ab.", vol. 55, Ab. No. 19963e, (1961).
Nakajima, "Chem. Ab.", vol. 56, Ab. No. 101446c, (1962).
Karpati et al., "Chem. Ab.", vol. 89, Ab. No. 163403k, (1978).

*Primary Examiner*—John Doll
*Attorney, Agent, or Firm*—Sprung, Felfe, Horn, Lynch & Kramer

[57] ABSTRACT

There are disclosed the chemical compound N,N-dimethyl-N'-isobutyl-N'-β-hydroxyethyl-propylenediamine, a process for the preparation thereof and its use.

1 Claim, No Drawings

N,N-DIMETHYL-N'-ISOBUTYL-N'-β-HYDROX-YETHYL-PROPYLENEDIAMINE AND A PROCESS FOR ITS PREPARATION

BACKGROUND OF THE INVENTION

1. Field of the Invention

This invention concerns the chemical compound N,N-dimethyl-N'-isobutyl-N'-β-hydroxyethyl-propylenediamine, a process for its preparation and its use.

2. Discussion of the Prior Art

It is known that the addition of compounds with labile hydrogen to isocyanates, leading to the formation of polyurethanes, is catalyzed by tertiary amines. Certain tertiary hydroxyalkylamines have also been described as catalysts for the preparation of polyurethanes from the aforementioned starting substances. Thus, dimethylethanolamine may, for example, be used for this purpose. However, a disadvantage is the fact that this compound is rather volatile and has poor gel formation and hardening properties. Dimethylethanolamine is thus generally used only as a co-catalyst in conjunction with other catalysts.

German Offenlegungsschrift 26 25 684 describes a process for accelerating addition and polymerization reactions of organic isocyanates by base catalysts.

In this procedure, hydroxyalkyl-tert.-amines having at least one primary hydroxyethyl group of the general formula

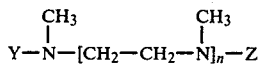

where
Y is $CH_3$ or Z,
Z is $CH_2-CH_2-OH$ and
n is 1 or 2,
are used as catalyst.

These compounds are, it is true, suitable as catalysts for preparing polyurethanes from isocyanates. Their preparation according to the Leuckart synthesis by reacting amines with aldehydes or ketones by heating with formic acid is, however, commercially costly and, on account of the necessary large excess of formic acid and the complicated working up of the reaction product, cannot always be carried out economically.

It is an object of this invention, therefore, to provide a readily obtainable catalyst for catalyzing the addition of compounds with labile hydrogen to isocyanate, which catalyst can moreover be produced industrially in a simple manner.

SUMMARY OF THE INVENTION

The invention consists in the chemical compound N,N-dimethyl-N'-isobutyl-N'-β-hydroxyethyl-propylenediamine.

The new compound can be prepared according to the invention in a three-stage, highly selective synthesis.

In the first reaction step dimethylaminopropylamine and isobutyraldehyde are reacted to form the corresponding Schiff base. Both starting materials are available industrially and the reaction takes place with a high degree of selectivity. Although dimethylaminopropylamine is a strong base, isobutyraldehyde surprisingly does not undergo any aldol condensation. Neither isobutyraldehyde nor other by-products are formed.

The reaction of dimethylaminopropylamine and isobutyraldehyde is generally conducted at a temperature between 0° and 60° C., preferably between 20° and 30° C. at pressures from as low as 100 Torr up to 10 atmospheres with atmospheric pressure being employed. The mole ratio of dimethylaminopropylamine to isobutyraldehyde is generally 1:1 to 2:1. The process is conducted for a period of time sufficient to form the corresponding Schiff base. Generally, the process is carried out for at least 180 minutes and up to 300 minutes. The process can be carried out in a solvent or without the use of a solvent. If a solvent is employed, the solvent can be: iso-octane, toluene, ether or other inerts solvents without functional groups.

Generally speaking, the process is carried out by controlling the temperature by the use of externally applied cooling. This cooling can be applied, for instance, by the use of jacketed reaction vessels through pass a cooling fluid, e.g., water.

The Schiff base resulting from the reaction between the amine and aldehyde is then hydrogenated in a second reaction step to N,N-dimethyl-N'-isobutyl-propylenediamine. The reaction with hydrogen can be carried out according to methods known for Schiff bases. Nickel catalysts having a nickel content of 30 to 50% by weight and carriers such as silicic acid, aluminum oxide or aluminum silicates have proven particularly suitable. The reaction is normally carried out at 80°–130° C. and at 80–120 bars. Generally speaking, any catalyst suitable for hydrogenation can be employed. In addition to the aforementioned nickel catalysts, other supported and non-supported catalysts which can be employed include the following catalysts: Raney nickel, Raney cobalt, platinum, palladium, rhodium. Generally speaking, the catalyst need only have sufficient catalytically active metal thereon to insure hydrogenation of the Schiff base to N,N'-dimethyl-N'-isobutyl-propylenediamine. The hydrogenation is carried out until the propylenediamine forms, usually at least 90 minutes and generally up to 180 minutes.

Finally, in the third reaction step the substituted propylenediamine is reacted with ethylene oxide in order to introduce a hydroxyethyl group into the molecule. The addition of the ethylene oxide is advantageously carried out in the presence of a strongly acid ion exchanger at temperatures between 80° and 150° C. and pressures of 0–20 bars. Under these conditions the reaction proceeds with a selectivity of 80–90% referred to the substituted hydroxylamine.

The third step is performed using ethylene oxide in an amount of 1 and 2, preferably 1.1 and 1.5 moles per mole of N,N-dimethyl-N'-isobutyl-propylenediamine. This reaction is performed until the desired N,N-dimethyl-N'-isobutyl-N'-hydroxyethylpropylenediamine is formed. Generally, the reaction is performed for at least 90 minutes and up to 180 minutes with 100 to 150 minutes being preferred.

The new compound has proven to be an excellent catalyst for producing polyurethane resins from isocyanates and compounds with labile hydrogen atoms. In this field of application, it can be used alone or also in conjunction with other tertiary amines or with organometallic compounds. No restrictions are placed on the nature or type of reactants. Thus, isocyanates can be reacted with all polyols used for preparing polyurethanes, in the presence of the compound according to the invention as catalyst. Suitable polyhydroxy alcohols include glycol, glycerol and higher polyols, e.g., sucruse and aminopolyols. The hydroxy groups of the polyol may be primary or secondary or a mixture of both. In general, any polyol containing at least two active hydrogen atoms can be used. Generally speaking, the new catalyst is present in a polymerization reaction mixture in an amount of 1 to 10, preferably 2 to 5 weight percent, based on the weight of the reactants. Of the isocyanates contemplated, there are particularly contemplated the following isocyanates: tolylene diisocyanate (TDI), hexamethylene-1,6-diisocyanate (HMDI), 4.4'-diphenylmethane diisocyanate (MDI). In addition to the above-named polyols, there are also contemplated for the formation of polyurethane the following polyols: trimethylolpropane, glycerol, 2.2-dimethylpropandiol-(1.3), polyethylene glycol, polypropylene glycol as well as the reaction products of propylene oxide with polyhydric alcohols in addition, oligomeric esters from dicarboxylic acids and diols (polyester alcohols) are also employed

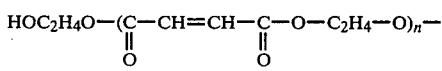

In addition to its use as a catalyst in producing polyurethanes, the new compound can also be used as a valuable intermediate in the synthesis of pharmaceuticals. Thus, reaction with 3,4,5-trimethoxybenzoyl chloride produces an ester having cardio-active properties.

The preparation of the new compound and its physical properties are described in more detail in the following examples.

EXAMPLE

1st Stage

Preparation of the Schiff base from dimethylaminopropylamine (DMAPA) and isobutyraldehyde.

721 g (10 moles) of isobutyraldehyde was added dropwise within 2 hours and while stirring to 1020 g (10 moles) of DMAPA in a 4-liter three-necked flask. The reaction temperature was maintained below 30° C. by cooling. The temperature during the subsequent post-reaction, which lasted for 2 hours, was about 20° C. A two-phase system was present at the end of the reaction. The aqueous phase, which almost corresponded to the stoichiometrically expected amount of water, was separated, and the organic phase was passed to the catalytic hydrogenation.

Degree of Conversion: >90%

Yield: 1451 g (93% of theory)

2nd Stage

Catalytic hydrogenation of the Schiff base formed from DMAPA and isobutyraldehyde, to N,N-dimethyl-N'-isobutylpropyleneamine.

1451 g (9.3 moles) of the Schiff base were hydrogenated at 80° C. and 80 bars in a 3-liter V4A-autoclave in the presence of 10% by weight of nickel catlyst(composition: about 52% by weight of Ni, remainder kieselguhr) referred to the Schiff base. The reaction time was 2 hours. On working up the reaction product by distillation, 1249 g (85% of theory) of N,N-dimethyl-N'-isobutyl-propylenediamine were obtained in a purity of >98%.

3rd Stage

Addition of ethylene oxide to N,N-dimethyl-N'-isobutyl-propylenediamine to form N,N-dimethyl-N'-isobutyl-N'-hydroxyethyl-propylenediamine.

474 g (3 moles) of N,N-dimethyl-N'-isobutyl-propylenediamine and 10% by weight, referred to the propylenediamine, of a strongly acid ion exchanger were heated to 130° C. in a 2.8 liter autoclave. 145 g (3.3 moles) of ethylene oxide were then added via a fine metering pump. During the ethylene oxide addition and the subsequent post-reaction, the temperature should be between 130° and 160° C. At higher temperatures fairly large amounts of by-products are formed, due to the reaction of the ethylene oxide with itself. At the end of the addition of the ethylene oxide, a pressure of 20 bars was produced by means of nitrogen. The reaction mixture was left for a further period of 1 hour under these conditions. After completion of the post-reaction, the reaction product was fractionally distilled. N,N-dimethyl-N'-isobutyl-N'-$\beta$-hydroxyethyl-propylenediamine was obtained in a yield of 545 g (90% of theory) and with a purity of 98%, as a colorless liquid smelling faintly of amine and having the following physical properties:

$B_{p1}$: 102° C. $n_D^{20}$: 1.4525 $D_4^{20}$: 0.885 and the following chemical analysis:

|            | C     | H     | N     | O    |
|------------|-------|-------|-------|------|
| calculated | 65.30 | 12.95 | 13.84 | 7.90 |
| found      | 65.80 | 12.55 | 13.68 | 7.96 |

What is claimed is:

1. N,N-dimethyl-N'-isobutyl-N'-$\beta$-hydroxyethyl-propylenediamine.

* * * * *